(12) United States Patent
Gou et al.

(10) Patent No.: US 11,988,865 B2
(45) Date of Patent: May 21, 2024

(54) DISPLAY DEVICE

(71) Applicant: Japan Display Inc., Tokyo (JP)

(72) Inventors: Zhengyi Gou, Tokyo (JP); Kentaro Okuyama, Tokyo (JP); Hisanori Kawakami, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/656,962

(22) Filed: Mar. 29, 2022

(65) Prior Publication Data

US 2022/0221644 A1 Jul. 14, 2022

Related U.S. Application Data

(63) Continuation of application No. PCT/JP2020/029798, filed on Aug. 4, 2020.

(30) Foreign Application Priority Data

Oct. 2, 2019 (JP) ................................. 2019-181999

(51) Int. Cl.
*F21V 8/00* (2006.01)
*G02F 1/1334* (2006.01)
*G02F 1/1343* (2006.01)

(52) U.S. Cl.
CPC ......... *G02B 6/0078* (2013.01); *G02B 6/0068* (2013.01); *G02F 1/1334* (2013.01); *G02F 1/134309* (2013.01); *G02F 2202/28* (2013.01)

(58) Field of Classification Search
CPC .... G02B 6/0078; G02B 6/0068; G02F 1/1334
See application file for complete search history.

(56) References Cited

U.S. PATENT DOCUMENTS 2,369,373 A * 2/1945 Sheldon ................ E04B 2/7845
52/793.11
6,847,428 B1 1/2005 Sekiguchi et al.
(Continued)

FOREIGN PATENT DOCUMENTS

JP 2000-105553 A 4/2000
JP 2010-92682 A 4/2010
(Continued)

OTHER PUBLICATIONS

International Search Report dated Sep. 24, 2020 in PCT/JP2020/029798 filed Aug. 4, 2020 citing documents AC-AE and AQ-AS therein, 2 pages.

(Continued)

*Primary Examiner* — Lucy P Chien
(74) *Attorney, Agent, or Firm* — Maier & Maier, PLLC

(57) ABSTRACT

According to one embodiment, a display device includes a display panel having a first side surface extending along a first direction and including a polymer dispersed liquid crystal layer, and a first light emitting module provided along the first side surface. The first light emitting module includes a plurality of first light sources arranged in the first direction, a plurality of second light sources arranged in the first direction, a first light guide provided between the plurality of first light sources and the first side surface, and a second light guide provided between the plurality of second light sources and the first side surface, and an end surface of the first light guide and an end surface of the second light guide face each other with an air layer interposed therebetween.

20 Claims, 11 Drawing Sheets

(56) References Cited

U.S. PATENT DOCUMENTS

| | | | |
|---|---|---|---|
| 2006/0238103 A1* | 10/2006 | Choi | G02F 1/133617 |
| | | | 313/486 |
| 2010/0085510 A1 | 4/2010 | Okuyama et al. | |
| 2011/0149201 A1 | 6/2011 | Powell et al. | |
| 2016/0070047 A1 | 3/2016 | Okuyama et al. | |
| 2017/0269433 A1 | 9/2017 | Sugiyama et al. | |
| 2018/0031758 A1 | 2/2018 | Mizuno et al. | |

FOREIGN PATENT DOCUMENTS

| | | | |
|---|---|---|---|
| JP | 2016-57338 A | | 4/2016 |
| JP | 2018-21974 A | | 2/2018 |
| WO | WO 00/79338 A1 | | 12/2000 |
| WO | WO2011083617 A | * | 10/2010 |

OTHER PUBLICATIONS

Office Action dated Aug. 1, 2023, in corresponding Japanese Application No. 2019-181999; 8 pages.
Office Action dated Aug. 25, 2023, in corresponding Chinese Application No. 202080069628.0; 9 pages.

* cited by examiner

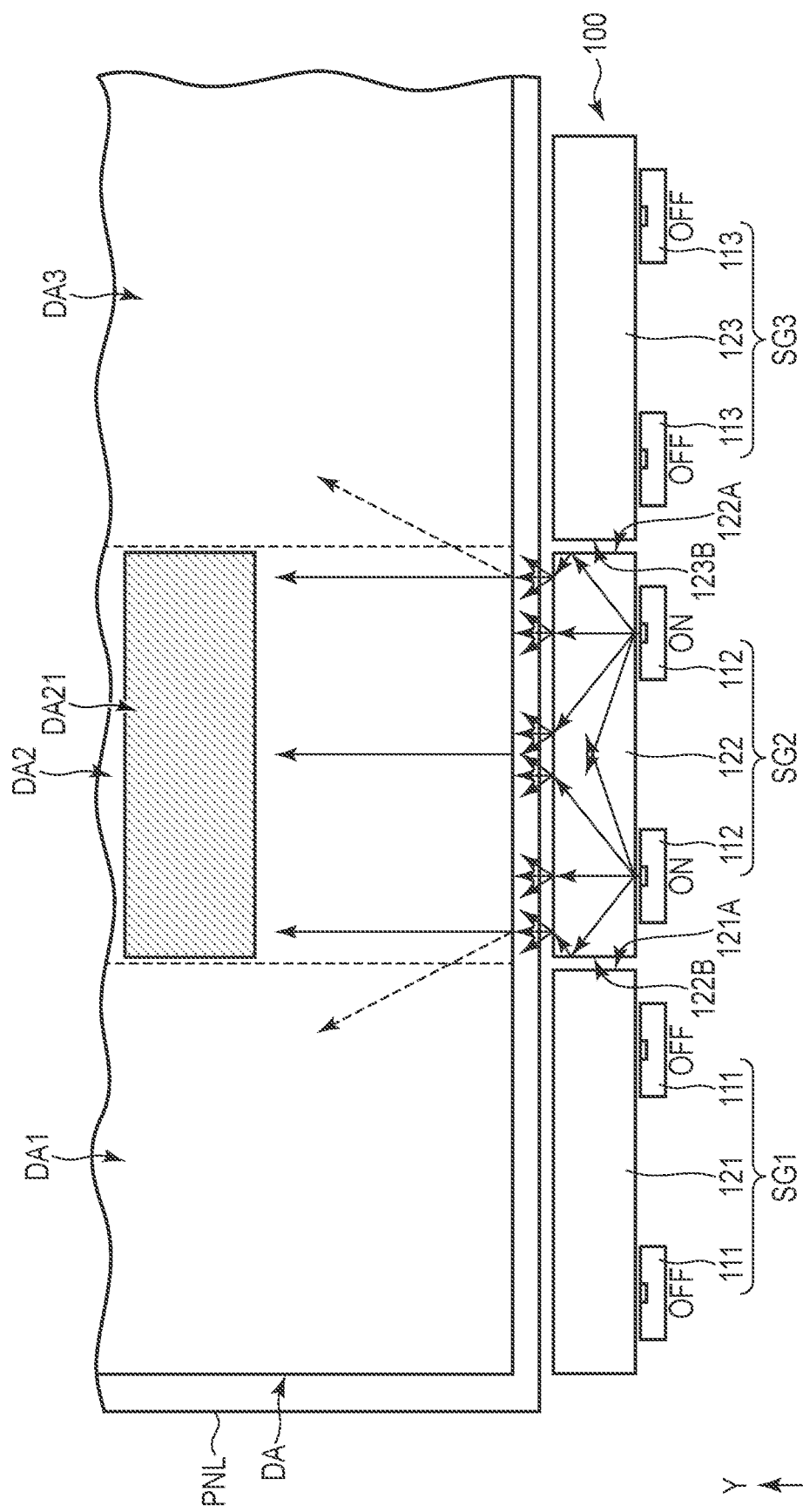
F I G. 6

DISPLAY DEVICE

CROSS-REFERENCE TO RELATED APPLICATIONS

This application is a Continuation Application of PCT Application No. PCT/JP2020/029798, filed Aug. 4, 2020 and based upon and claiming the benefit of priority from Japanese Patent Application No. 2019-181999, filed Oct. 2, 2019, the entire contents of all of which are incorporated herein by reference.

FIELD

Embodiments described herein relate generally to a display device.

BACKGROUND

In recent years, various illumination devices including a light modulating element exhibiting scattering property or transparency to light have been proposed. In an example, the light modulating element includes a polymer dispersed liquid crystal layer as a light modulating layer. The light modulating element is disposed behind a light guide and scatters incident light from a side surface of the light guide.

The light emitted from a plurality of light emitting elements arranged at intervals propagates inside the light guide while diffusing. In an area near the light emitting element in the light guide, the light from each light emitting element may not sufficiently mix with each other. In this case, brightness and darkness of light may be visually recognized as non-uniformity in stripe.

BRIEF DESCRIPTION OF THE DRAWINGS

FIG. 6 is a diagram for explaining local dimming drive of the first light emitting module 100.

DETAILED DESCRIPTION

Figure 1:
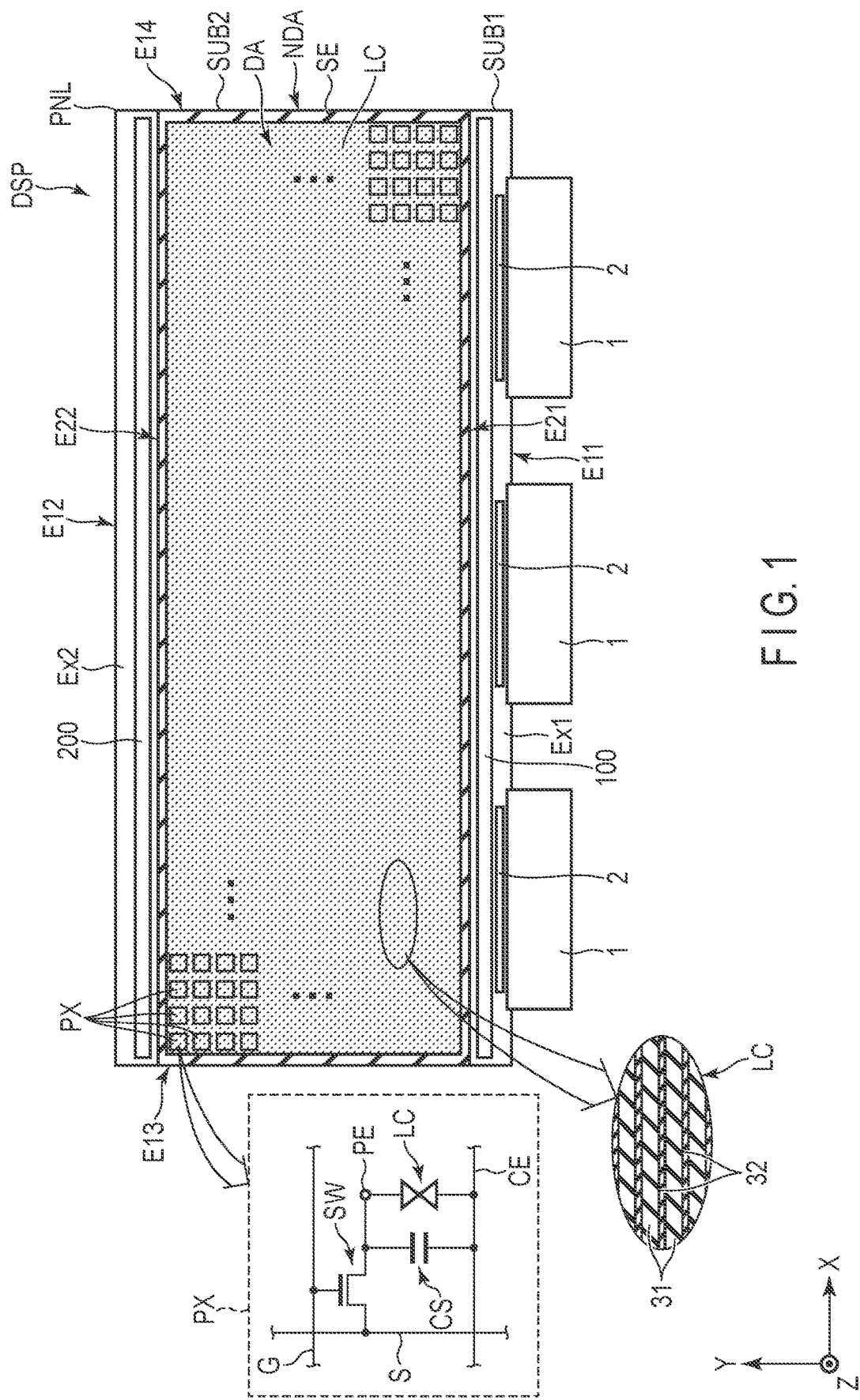
FIG. 1 is a plan view illustrating a configuration example of a display device DSP according to an embodiment.

According to one embodiment, a display device includes: a display panel having a first side surface extending along a first direction and including a polymer dispersed liquid crystal layer; and a first light emitting module provided along the first side surface, wherein the first light emitting module includes: a plurality of first light sources arranged in the first direction; a plurality of second light sources arranged in the first direction; a first light guide provided between the plurality of first light sources and the first side surface; and a second light guide provided between the plurality of second light sources and the first side surface, and an end surface of the first light guide and an end surface of the second light guide face each other with an air layer interposed therebetween.

According to an embodiment, it is possible to provide a display device capable of suppressing deterioration in display quality.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view illustrating a configuration example of a display device DSP of the present embodiment. In an example, the first direction X, the second direction Y, and the third direction Z are orthogonal to each other, but may intersect at an angle other than 90 degrees. The first direction X and the second direction Y correspond to a direction parallel to a main surface of a substrate constituting the display device DSP, and the third direction Z corresponds to a thickness direction of the display device DSP. In the present embodiment, viewing an X-Y plane defined by the first direction X and the second direction Y is referred to as a planar view.

The display device DSP includes a display panel PNL including a polymer dispersed liquid crystal layer (hereinafter, simply referred to as a liquid crystal layer LC), a wiring substrate 1, an IC chip 2, a first light emitting module 100, and a second light emitting module 200. The display panel PNL has a pair of side surfaces E11 and E11 extending along the first direction X and a pair of side surfaces E13 and E14 extending along the second direction Y. In the example illustrated in FIG. 1, the side surfaces E11 and E11 are side surfaces formed along a long side of the display panel PNL, and the side surfaces E13 and E14 are side surfaces formed along a short side of the display panel PNL.

The display panel PNL includes a first substrate SUB1, a second substrate SUB2, a liquid crystal layer LC, and a seal SE. The first substrate SUB1 and the second substrate SUB2 overlap each other in a planar view. The first substrate SUB1 and the second substrate SUB2 are adhered by the seal SE. The liquid crystal layer LC is held between the first substrate SUB1 and the second substrate SUB2, and is sealed by the seal SE.

As schematically shown in an enlarged manner in FIG. 1, the liquid crystal layer LC contains a polymer 31 and a liquid crystal molecule 32. In an example, the polymer 31 is a liquid crystalline polymer. The polymers 31 are formed in a streak shape extending along the first direction X and are arranged in the second direction Y. The liquid crystal molecules 32 are dispersed in the gaps between the polymers 31, and are aligned so that their long axes are along the first direction X. Each of the polymer 31 and the liquid crystal molecule 32 has optical anisotropy or refractive anisotropy. The responsiveness of the polymer 31 to the electric field is lower than the responsiveness of the liquid crystal molecule 32 to the electric field.

In an example, an alignment direction of the polymer 31 hardly changes regardless of the presence or absence of the electric field. On the other hand, an alignment direction of the liquid crystal molecule 32 changes according to the electric field in a state where a high voltage equal to or higher than a threshold value is applied to the liquid crystal layer LC. In the state in which the voltage is not applied to the liquid crystal layer LC, the optical axes of the polymer 31 and the liquid crystal molecule 32 are parallel to each other, and the light incident on the liquid crystal layer LC is transmitted without being almost scattered in the liquid crystal layer LC (transparent state). In the state in which the voltage is applied to the liquid crystal layer LC, the optical axes of the polymer 31 and the liquid crystal molecule 32 cross each other, and the light incident on the liquid crystal layer LC is scattered in the liquid crystal layer LC (scattering state).

The display panel PNL includes a display portion DA that displays an image, and a frame-shaped non-display portion NDA that surrounds the display portion DA. The seal SE is located in the non-display portion NDA. The display portion DA includes pixels PX arranged in a matrix in the first direction X and the second direction Y.

As illustrated in an enlarged manner in FIG. 1, each pixel PX includes a switching element SW, a pixel electrode PE, a common electrode CE, a liquid crystal layer LC, and the like. The switching element SW includes, for example, a thin film transistor (TFT), and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is provided in common for a plurality of pixel electrodes PE. The liquid crystal layer LC (in particular, liquid crystal molecule 32) is driven by an electric field generated between the pixel electrode PE and the common electrode CE. A capacitance CS is formed, for example, between an electrode having the same potential as the common electrode CE and an electrode having the same potential as the pixel electrode PE.

As will be described later, the scanning line G, the signal line S, the switching element SW, and the pixel electrode PE are provided on the first substrate SUB1, and the common electrode CE is provided on the second substrate SUB2. In the first substrate SUB1, the scanning line G and the signal line S are electrically connected to the wiring substrate 1 or the IC chip 2.

In the display panel PNL, the second substrate SUB2 has a first side surface E21 and a second side surface E22 opposite to the first side surface E21. The first side surface E21 and the second side surface E22 extend along the first direction X. In the example illustrated in FIG. 1, the first side surface E21 and the second side surface E22 are side surfaces formed along the long side of the second substrate SUB2, but may be side surfaces formed along the short side of the second substrate SUB2.

The first substrate SUB1 includes a first extending portion Ex1 and a second extending portion Ex2 on the opposite side of the first extending portion Ex1 as portions not being superimposed on the second substrate SUB2. The first extending portion Ex1 corresponds to a portion of the first substrate SUB1 extending in the second direction Y from the first side surface E21. The second extending portion Ex2 corresponds to a portion of the first substrate SUB1 extending in the second direction Y from the second side surface E22. In a planar view, the display portion DA and the second substrate SUB2 are located between the first extending portion Ex1 and the second extending portion Ex2.

The wiring substrate 1 and the IC chip 2 are mounted on the first extending portion Ex1. The wiring substrate 1 is, for example, a bendable flexible printed circuit board. The IC chip 2 incorporates, for example, a display driver that outputs a signal necessary for image display. Note that the IC chip 2 may be mounted on the wiring substrate 1. In the example illustrated in FIG. 1, a plurality of wiring substrates 1 are applied, but a single wiring substrate 1 may be applied. In addition, although a plurality of IC chips 2 are applied, a single IC chip 2 may be applied.

Although details of the first light emitting module 100 and the second light emitting module 200 will be described later, each of the first light emitting module 100 and the second light emitting module 200 is provided along a side surface (or an end portion) of the display panel PNL. In the example illustrated in FIG. 1, the first light emitting module 100 overlaps the first extending portion Ex1 in a planar view, is provided along the first side surface E21 of the second substrate SUB2, and emits light toward the first side surface E21. The second light emitting module 200 overlaps the second extending portion Ex2 in a planar view, is provided along the second side surface E22 of the second substrate SUB2, and emits light toward the second side surface E22.

Note that the first light emitting module 100 and the second light emitting module 200 may be provided along other side surfaces of the display panel PNL, for example, may be provided along other side surfaces E13 and E14. The side surfaces E13 and E14 include a side surface of the first substrate SUB1 and a side surface of the second substrate SUB2. In this case, the first light emitting module 100 may emit light toward any of the side surfaces of the first substrate SUB1 and the second substrate SUB2, or may emit light toward both the side surfaces of the first substrate SUB1 and the second substrate SUB2. However, when the first light emitting module 100 and the second light emitting module 200 are provided along the side surfaces E13 and E14, respectively, the polymer 31 of the liquid crystal layer LC is formed in a streak shape extending along the second direction Y, and the liquid crystal molecule 32 is aligned so that its long axis is along the second direction Y.

Although FIG. 1 illustrates an example in which the display device DSP includes the first light emitting module 100 and the second light emitting module 200, the display device DSP may include any one of the first light emitting module 100 and the second light emitting module 200.

Figure 2:
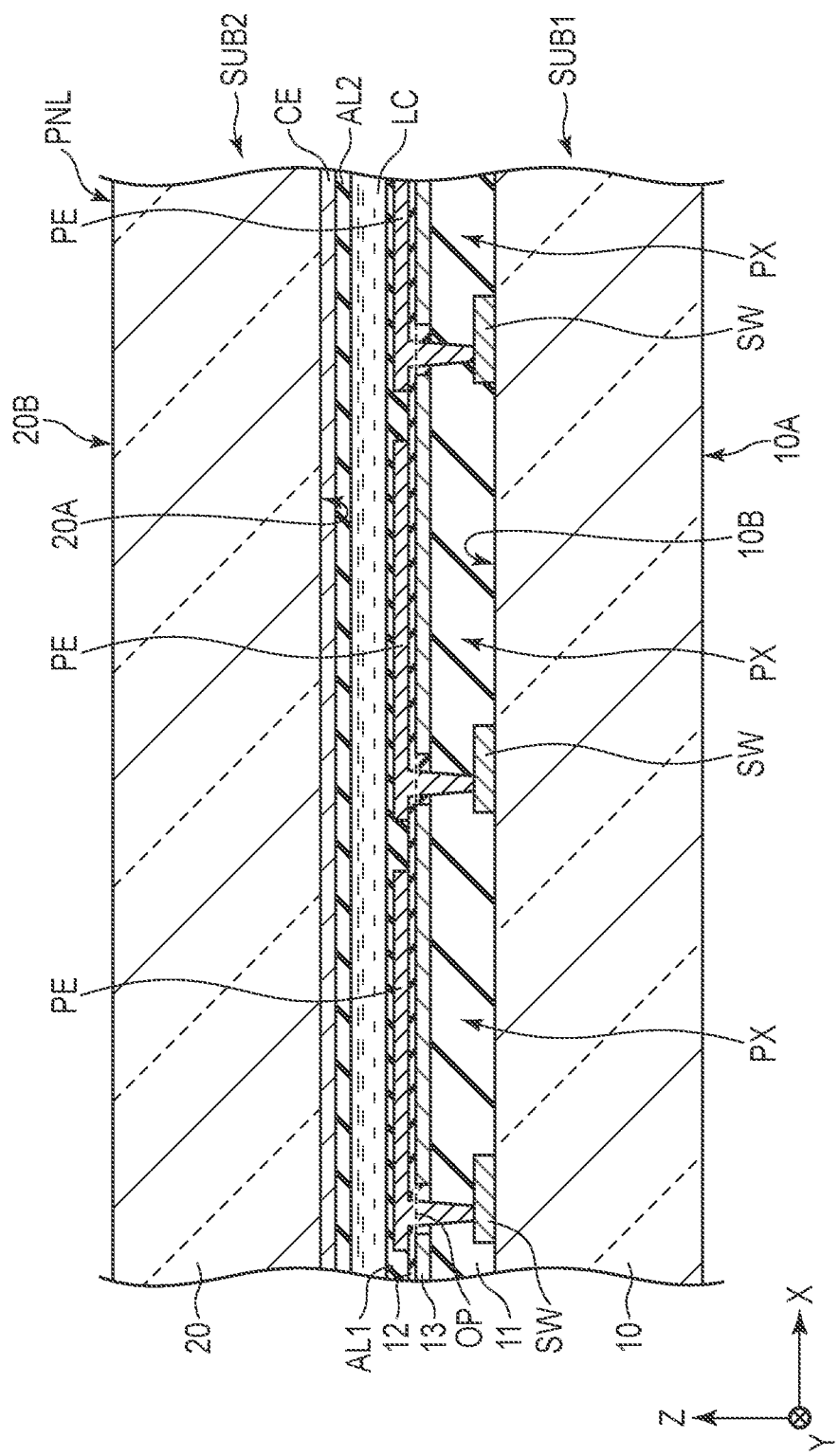
FIG. 2 is a cross-sectional view illustrating a configuration example of a display panel PNL illustrated in FIG. 1.

FIG. 2 is a cross-sectional view illustrating a configuration example of the display panel PNL illustrated in FIG. 1.

The first substrate SUB1 includes a transparent substrate 10, insulating films 11 and 12, a capacitive electrode 13, a switching element SW, a pixel electrode PE, and an alignment film AL1. The transparent substrate 10 includes a main surface (outer surface) 10A and a main surface (inner surface) 10B opposite to the main surface 10A. The switching element SW is provided on the main surface 10B side. The insulating film 11 is provided on the main surface 10B and covers the switching element SW. Note that the scanning line G and the signal line S illustrated in FIG. 1 are provided between the transparent substrate 10 and the insulating film 11, but are not illustrated here. The capacitive electrode 13 is provided between the insulating films 11 and 12. The pixel electrode PE is provided for each pixel PX between the insulating film 12 and the alignment film AL1. That is, the capacitive electrode 13 is provided between the transparent substrate 10 and the pixel electrode PE. The pixel electrode PE is electrically connected to the switching element SW via an opening OP of the capacitive electrode 13. The pixel electrode PE overlaps the capacitive electrode 13 with the insulating film 12 interposed therebetween to form a capacitance CS of the pixel PX. The alignment film AL1 covers the pixel electrode PE. The alignment film AL1 is in contact with the liquid crystal layer LC.

The second substrate SUB2 includes a transparent substrate 20, a common electrode CE, and an alignment film AL2. The transparent substrate 20 includes a main surface (inner surface) 20A and a main surface (outer surface) 20B opposite to the main surface 20A. The main surface 20A of the transparent substrate 20 faces the main surface 10B of the transparent substrate 10. The common electrode CE is provided on the main surface 20A. The alignment film AL2 covers the common electrode CE. The alignment film AL2 is in contact with the liquid crystal layer LC. In the second substrate SUB2, a light-shielding layer may be provided directly above the switching element SW, the scanning line G, and the signal line S. A transparent insulating film may be provided between the transparent substrate 20 and the common electrode CE or between the common electrode CE and the alignment film AL2. The common electrode CE is disposed over a plurality of pixels PX and faces the plurality of pixel electrodes PE in the third direction Z. The common electrode CE is electrically connected to the capacitive electrode 13, and has the same potential as the capacitive electrode 13.

The liquid crystal layer LC is located between the pixel electrode PE and the common electrode CE.

The transparent substrates 10 and 20 are, for example, glass substrates, but may be insulating substrates such as plastic substrates. The insulating film 11 contains, for example, a transparent inorganic insulating film such as silicon oxide, silicon nitride, or silicon oxynitride, and a transparent organic insulating film such as acrylic resin. The insulating film 12 is a transparent inorganic insulating film such as silicon nitride. The capacitive electrode 13, the pixel electrode PE, and the common electrode CE are transparent electrodes formed of a transparent conductive material such as indium tin oxide (ITO) or indium zinc oxide (IZO). The alignment films AL1 and AL2 are horizontal alignment films having an alignment restriction force substantially parallel to the X-Y plane. In an example, the alignment films AL1 and AL2 are subjected to alignment treatment along the first direction X. The alignment treatment may be rubbing treatment or photo-alignment treatment.

Next, the first light emitting module 100 and the second light emitting module 200 will be described. The first light emitting module 100 and the second light emitting module 200 are configured substantially similarly, and the first light emitting module 100 will be described below, and the description of the second light emitting module 200 will be omitted.

Figure 3:
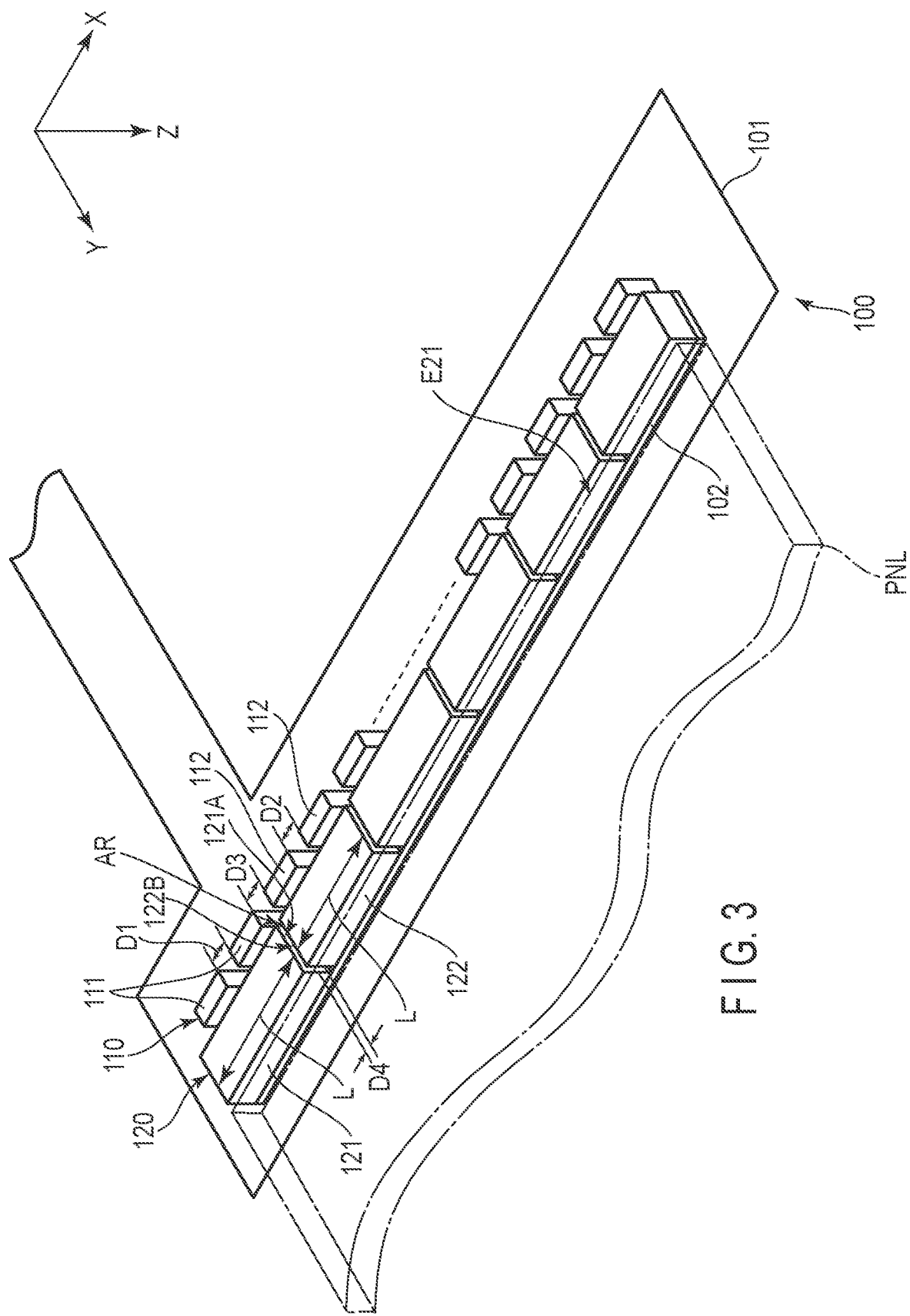
FIG. 3 is a perspective view illustrating a configuration example of a first light emitting module 100 illustrated in FIG. 1.

FIG. 3 is a perspective view illustrating a configuration example of the first light emitting module 100 illustrated in FIG. 1. The first light emitting module 100 includes a wiring substrate 101, an adhesive layer 102, a plurality of light sources 110, and a plurality of light guides (prism lenses) 120. Note that the number of light sources 110 and the number of light guides 120 included in the first light emitting module 100 are not limited to the illustrated example. A part of the display panel PNL is indicated by one-dot chain line.

The plurality of light sources 110 are arranged at intervals along the first direction X and electrically connected to the wiring substrate 101. Preferably, the plurality of light sources 110 are arranged at regular intervals. The light source 110 basically has the same specification, and is, for example, a white light source that emits white light. Examples of the light source applicable to the present embodiment include a light emitting element incorporating a red light emitting chip, a green light emitting chip, and a blue light emitting chip, and a light emitting element incorporating a blue light emitting chip and a yellow phosphor. The light emitting chip of each color is, for example, a light emitting diode. The light-emitting chip emits light in a point shape as referred to as a point source. The presence of the light emitting chip can be recognized as a light emitting point that emits light in a point shape when light is emitted.

The plurality of light guides 120 are made of resin, for example, are each formed in a transparent rod shape, and extend along the first direction X. The light guides 120 basically have the same shape, and have the same length L along the first direction X. The plurality of light guides 120 are arranged along the first direction X and adhered to the wiring substrate 101 by the adhesive layer 102. The two adjacent light guides 120 are not adhered, and are arranged so that their end surfaces face each other with an air layer AR interposed therebetween.

The plurality of light sources 110 and one light guide 120 constitute one segment. The number of light sources 110 facing one light guide 120 is the same in each segment. In each segment, the number of light sources 110 facing one light guide 120 is 2 to 4.

The plurality of light sources 110 include a first light sources 111 and a second light sources 112. The plurality of light guides 120 include a first light guide 121 and a second light guide 122. In the example illustrated in FIG. 3, the two first light sources 111 face the first light guide 121 in the second direction Y. In addition, the first light guide 121 is located between the first side surface E21 of the display panel PNL and the plurality of first light sources 111 in the second direction Y. The two second light sources 112 face the second light guide 122 in the second direction Y. In addition, the second light guide 122 is located between the first side surface E21 of the display panel PNL and the plurality of second light sources 112 in the second direction Y. The end surface 121A of the first light guide 121 and the end surface 122B of the second light guide 122 face each other with the air layer AR interposed therebetween.

An interval D1 between the two first light sources 111 is equal to an interval D2 between the two second light sources 112. An interval D3 between the first light source 111 and the second light source 112 adjacent to each other in the first direction X is equal to or less than the interval D1. An interval D4 between the end surface 121A and the end surface 122B, that is, a thickness of the air layer AR along the first direction X is smaller than any of the intervals D1 to D3. Here, the interval is a distance along the first direction X. For example, the interval D4 is 1 mm or less.

Although the illustrated first light guide 121 is separated from the second light guide 122, it is considered that the air layer AR is substantially interposed between the first light guide 121 and the second light guide 122 even when the first light guide 121 and the second light guide 122 are arranged so as to be in contact with each other without an adhesive interposed therebetween.

Figure 4:
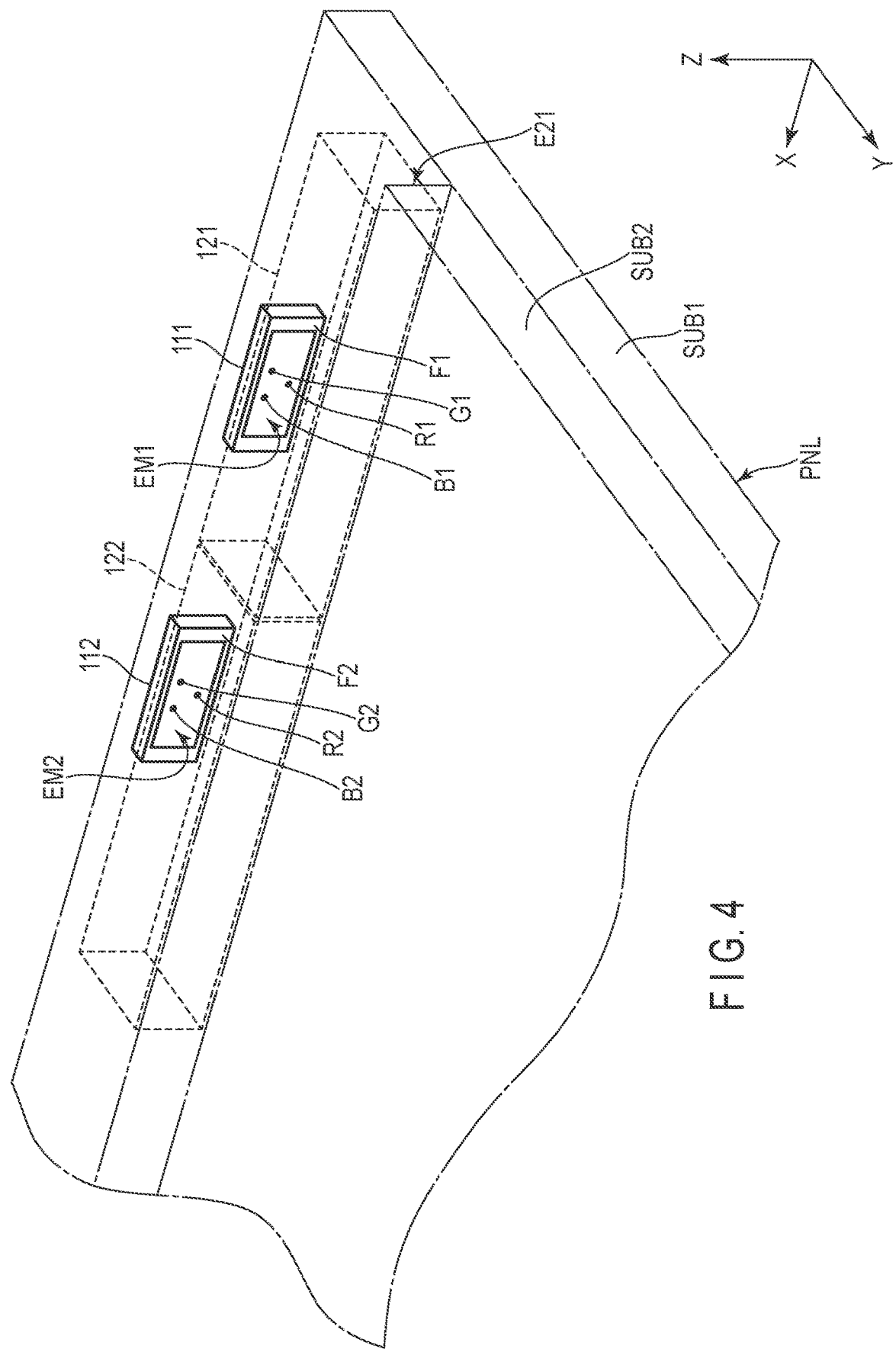
FIG. 4 is a perspective view illustrating a configuration example of a first light source 111 and a second light source 112 illustrated in FIG. 3.

FIG. 4 is a perspective view illustrating a configuration example of the first light source 111 and the second light source 112 illustrated in FIG. 3. In FIG. 4, the first light guide 121 and the second light guide 122 are indicated by dotted lines, and the display panel PNL is indicated by one-dot chain lines. The first light source 111 has a light-emitting surface EM1 surrounded by a frame F1 in an X-Z plane defined by the first direction X and the third direction Z. The first light source 111 has a red light emitting point R1, a green light emitting point G1, and a blue light emitting point B1 on the light-emitting surface EM1. In the example illustrated in FIG. 4, the red light emitting point R1, the green light emitting point G1, and the blue light emitting point B1 are arranged so as to correspond to vertices of a triangle in the X-Z plane, but may be arranged on the same straight line along the first direction X. The second light source 112 is also configured similarly to the first light source 111, and the second light source 112 has a red light emitting point R2, a green light emitting point G2, and a blue light emitting point B2 on a light-emitting surface EM2 surrounded by a frame F2.

The first light guide 121 is provided between the first light sources 111 and the first side surface E21 of the display panel PNL. The second light guide 122 is provided between the second light sources 112 and the first side surface E21.

In the first light source 111, the red light emitted from the red light emitting point R1, the green light emitted from the green light emitting point G1, and the blue light emitted from the blue light emitting point B1 are incident on the first light guide 121. The light incident on the first light guide 121 is appropriately diffused in the first light guide 121, and is incident on the display panel PNL. Similarly, the light emitted from the second light source 112 is incident on the display panel PNL via the second light guide 122.

Figure 5:
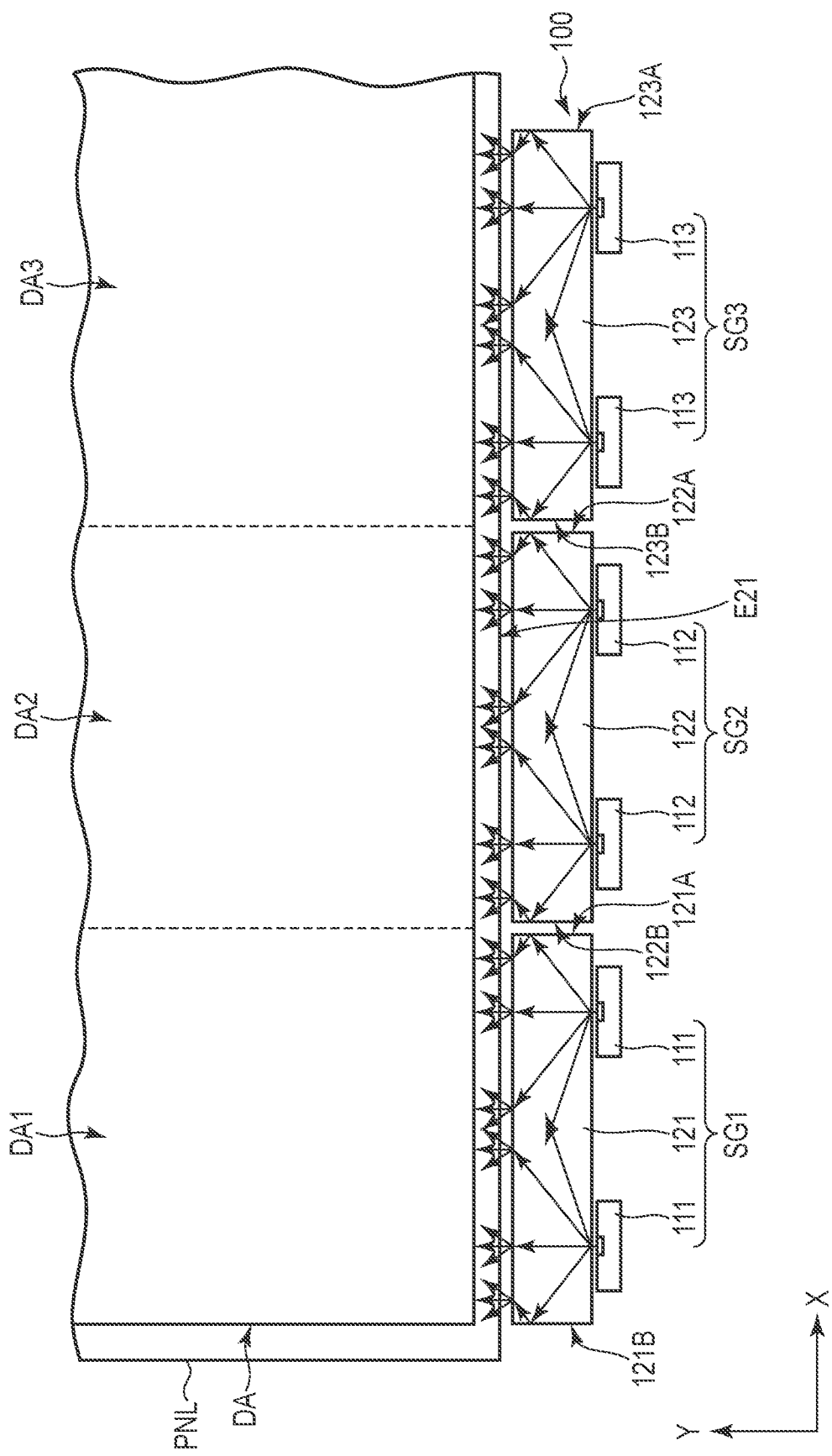
FIG. 5 is a plan view illustrating a state of propagation of light emitted from each light source 110 of the first light emitting module 100.

FIG. 5 is a plan view illustrating a state of propagation of light emitted from each light source 110 of the first light emitting module 100. Here, the description will be given focusing on three segments SG1 to SG3 of the first light emitting module 100. The segments SG1 to SG3 are arranged in this order in the first direction X. The segment SG1 includes first light sources 111 and a first light guide 121, the segment SG2 includes second light sources 112 and a second light guide 122, and the segment SG3 includes third light sources 113 and a third light guide 123. The display portion DA includes an area DA1 mainly illuminated by the segment SG1, an area DA2 mainly illuminated by the segment SG2, and an area DA3 mainly illuminated by the segment SG3. The areas DA1 to DA3 are arranged in this order in the first direction X.

For example, when attention is paid to the segment SG1, the light beams emitted from the adjacent first light sources 111, respectively, are incident on the first light guide 121, appropriately mixed in the first light guide 121, diffused, incident on the display panel PNL, and reach the area DA1. The light reached the end surfaces 121A and 121B of the first light guide 121 is totally reflected and reaches the area DA1. Also in the segment SG2 and the segment SG3, similarly to the segment SG1, the light emitted from the second light source 112 reaches the area DA2, and the light emitted from the third light source 113 reaches the area DA3.

FIG. 6 is a diagram for explaining local dimming drive of the first light emitting module 100. Here, it is assumed that the areas DA1 and DA3 are non-illumination areas, the area DA2 includes an illumination area DA21, and a bright image is displayed in the illumination area DA21. In this case, in the first light emitting module 100, the segments SG1 and SG3 are set to a non-lighting state (OFF), and the segment SG2 is set to a lighting state (ON).

In the segment SG2, the light beams emitted from the adjacent second light sources 112, respectively, are incident on the second light guide 122, appropriately mixed in the second light guide 122, diffused, incident on the display panel PNL, and reach the illumination area DA21 of the area DA2. At this time, the light reached the end surfaces 122A and 122B of the second light guide 122 is totally reflected and reaches the illumination area DA21. Therefore, the spread of the light emitted from the second light source 112 to the adjacent areas DA1 and DA3 is suppressed.

In order to compare with the present embodiment, a first comparative example and a second comparative example will be examined. In the first comparative example, a first light guide 121, a second light guide 122, and a third light guide 123 are replaced with a single light guide. In the second comparative example, an end surface 121A and an end surface 122B are adhered by an adhesive, an end surface 122A and an end surface 123B are adhered by an adhesive, and the adhesive has a refractive index equivalent to that of each light guide. In the first comparative example and the second comparative example, the light reached the vicinity of the end surfaces 122A and 122B of the present embodiment is diffused while traveling straight without being totally reflected. That is, the light reached the vicinity of the end surface 122A of the present embodiment reaches the area DA3, and the light reached the vicinity of the end surface 122B of the present embodiment reaches the area DA1. Therefore, the light emitted from the second light source 112 reaches not only the illumination area DA21 but also the periphery thereof, leading to a decrease in the contrast ratio.

According to the present embodiment, since the spread of the light emitted from the second light source 112 is suppressed, the amount of light reached the illumination area DA21 can be increased, the amount of light reached the periphery of the illumination area DA21 can be reduced, and a decrease in the contrast ratio can be suppressed. Therefore, degradation of display quality can be suppressed.

In addition, the light emitted from the second light source 112 can be guided to the illumination area DA21, and the utilization efficiency of the light can be improved.

Figure 7:
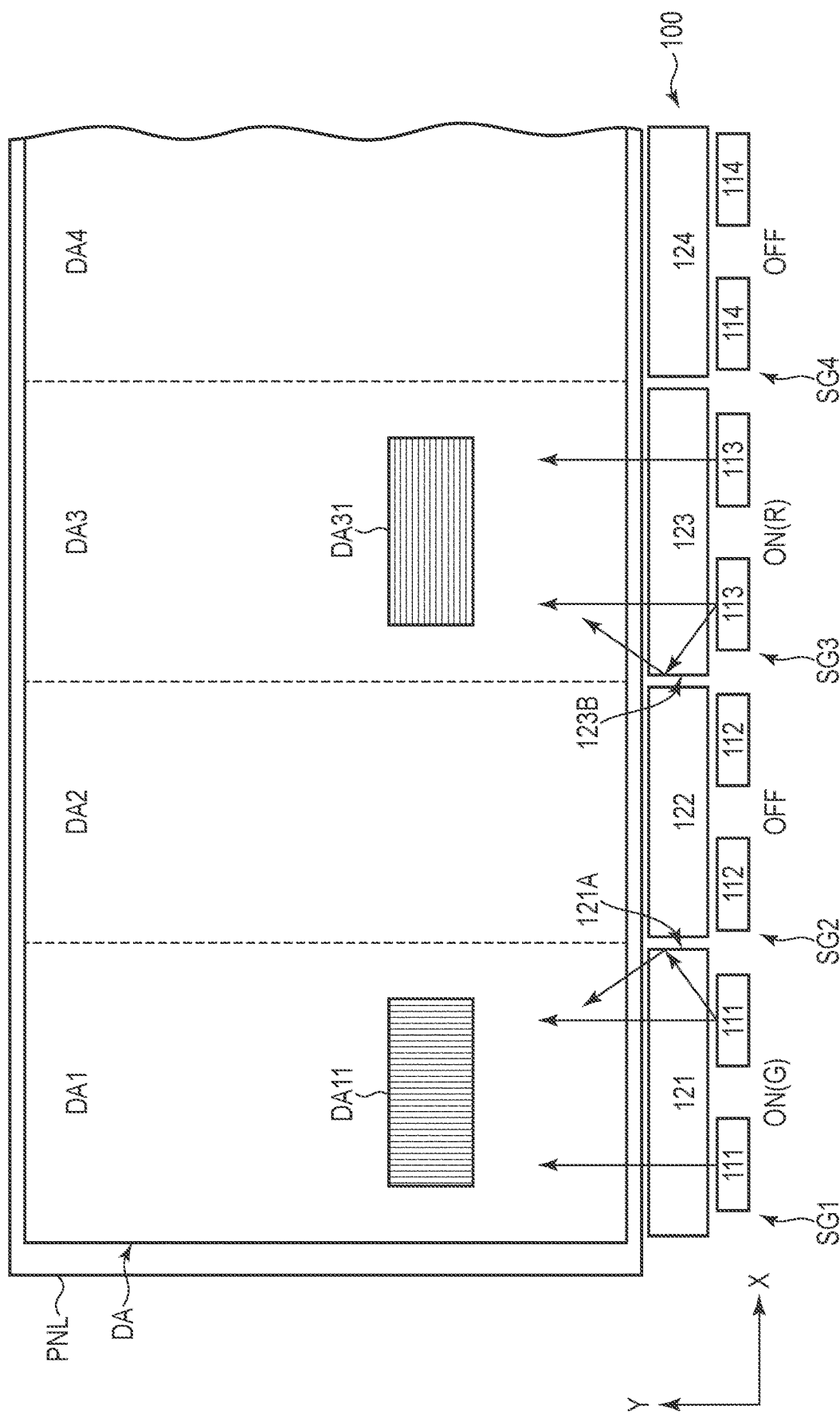
FIG. 7 is a diagram for explaining local dimming drive of a color screen.

FIG. 7 is a diagram for explaining local dimming drive of a color screen. Here, it is assumed that areas DA2 and DA4 are non-illumination areas, an area DA1 includes an illumination area DA11, an area DA3 includes an illumination area DA31, a green image is displayed in the illumination area DA11, and a red image is displayed in the illumination area DA31. In this case, in the first light emitting module 100, the segments SG2 and SG4 are set to the non-lighting state (OFF), and the segments SG1 and SG3 are set to the lighting state (ON). In the segment SG1, only the green light-emitting chip of the first light source 111 emits light, and in the segment SG3, only the red light-emitting chip of the third light source 113 emits light.

In the segment SG1, the green light emitted from each of the first light sources 111 reaches an illumination area DA11 via the first light guide 121. At this time, the green light reached the end surface 121A of the first light guide 121 is totally reflected and reaches the illumination area DA11. Therefore, the spread of the green light emitted from the first light source 111 to the areas DA1 to DA4 is suppressed.

In the segment SG3, the red light emitted from each of the third light sources 113 reaches the illumination area DA31 via the third light guide 123. At this time, the red light reached the end surface 123B of the third light guide 123 is totally reflected and reaches the illumination area DA31. Therefore, the spread of the red light emitted from the third light source 113 to the areas DA1 and DA2 is suppressed.

In the first comparative example and the second comparative example described above, when the green light of the first light source 111 reaches the vicinity of the end surface 121A of the present embodiment, the green light is diffused while traveling straight without being totally reflected. Such green light may reach the illumination area DA31. In the illumination area DA31, the green light of the first light source 111 and the red light of the third light source 113 are mixed, and a color purity of a red image in the illumination area DA31 decreases. Similarly, the red light of the third light source 113 may reach the illumination area DA11. In the illumination area DA11, the green light of the first light source 111 and the red light of the third light source 113 are mixed, and a color purity of a green image in the illumination area DA11 decreases.

According to the present embodiment, the spread of the green light emitted from the first light source 111 is suppressed, and the spread of the red light emitted from the third light source 113 is suppressed. Therefore, color mixing in the illumination areas DA11 and DA31 is suppressed, and a decrease in color purity of an image displayed in each illumination area can be suppressed. In addition, since a decrease in the color purity of each of the red image, the green image, and the blue image is suppressed, a color reproduction range of the color image that can be displayed on the display portion DA can be expanded. Therefore, the display quality can be improved.

Figure 8:
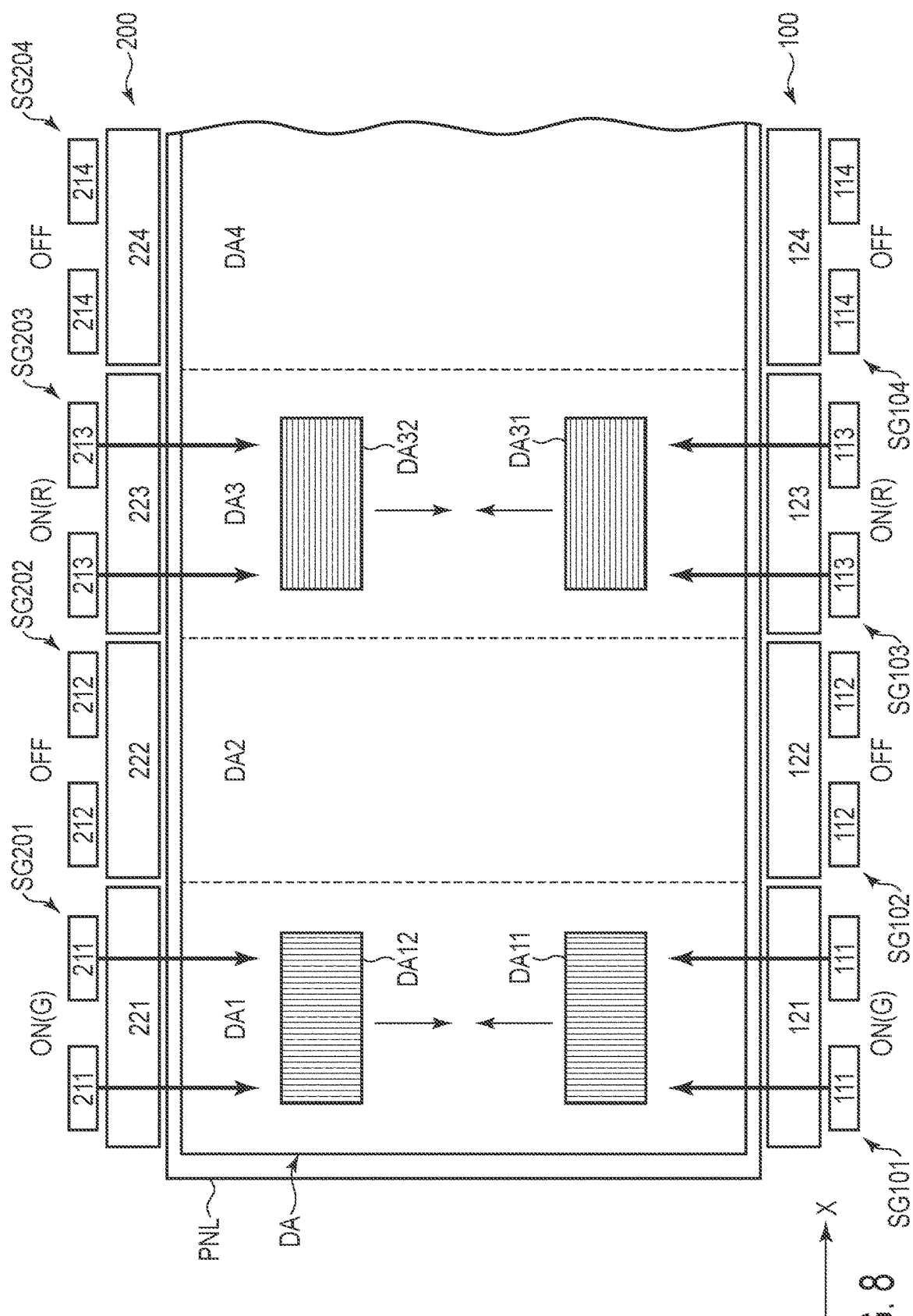
FIG. 8 is a diagram for explaining another local dimming drive of the color screen.

FIG. 8 is a diagram for explaining another local dimming drive of the color screen. The display portion DA is located between the first light emitting module 100 and the second light emitting module 200. The first light emitting module 100 includes segments SG101 to SG104, and the second light emitting module 200 includes segments SG201 to SG204.

As illustrated in detail, in the first light emitting module 100, the segment SG101 includes the light sources 111 and the light guide 121, the segment SG102 includes the light sources 112 and the light guide 122, the segment SG103 includes the light sources 113 and the light guide 123, and the segment SG104 includes the light sources 114 and the light guide 124. In the second light emitting module 200, the segment SG201 includes the light sources 211 and the light guide 221, the segment SG202 includes the light sources 212 and the light guide 222, the segment SG203 includes the light sources 213 and the light guide 223, and the segment SG204 includes the light sources 214 and the light guide 224.

Here, it is assumed that areas DA2 and DA4 are non-illumination areas, an area DA1 includes illumination areas DA11 and DA12, an area DA3 includes illumination areas DA31 and DA32, a green image is displayed in each of the illumination areas DA11 and DA12, and a red image is displayed in each of the illumination areas DA31 and DA32.

In the first light emitting module 100, the segments SG102 and SG104 are set to a non-lighting state (OFF), the segment SG101 is set to a lighting state (ON) in which green light is emitted, and the segment SG103 is set to a lighting state (ON) in which red light is emitted. In the second light emitting module 200, the segments SG202 and SG204 are set to the non-lighting state (OFF), the segment SG201 is set to the lighting state (ON) in which green light is emitted, and the segment SG203 is set to the lighting state (ON) in which red light is emitted.

In the segment SG101, the green light emitted from each of the light sources 111 reaches the illumination area DA11 via the light guide 121, and further travels toward the illumination area DA12. However, the green light from the light sources 111 attenuates as it travels in the second direction Y. Therefore, among the green light from the light sources 111, the green light reaching the illumination area DA12 is less than the green light reaching the illumination area DA11.

On the other hand, in the segment SG201, the green light emitted from each of the light sources 211 reaches the illumination area DA12 via the light guide 221, and further travels toward the illumination area DA11. That is, the illumination area DA11 is mainly illuminated with green light from the light sources 111, and the illumination area DA12 is mainly illuminated with green light from the light sources 211. Therefore, the luminance difference accompanying the attenuation of the green light from each light source is alleviated, and the display quality can be improved.

Similarly, in the segment SG103, the red light from the light sources 113 reaches the illumination area DA31 via the light guide 123. In the segment SG203, the red light from the light sources 213 reaches the illumination area DA32 via the light guide 223. Therefore, the luminance difference accompanying the attenuation of the red light from each light source is alleviated. Consequently, the display quality can be improved.

Figure 9:
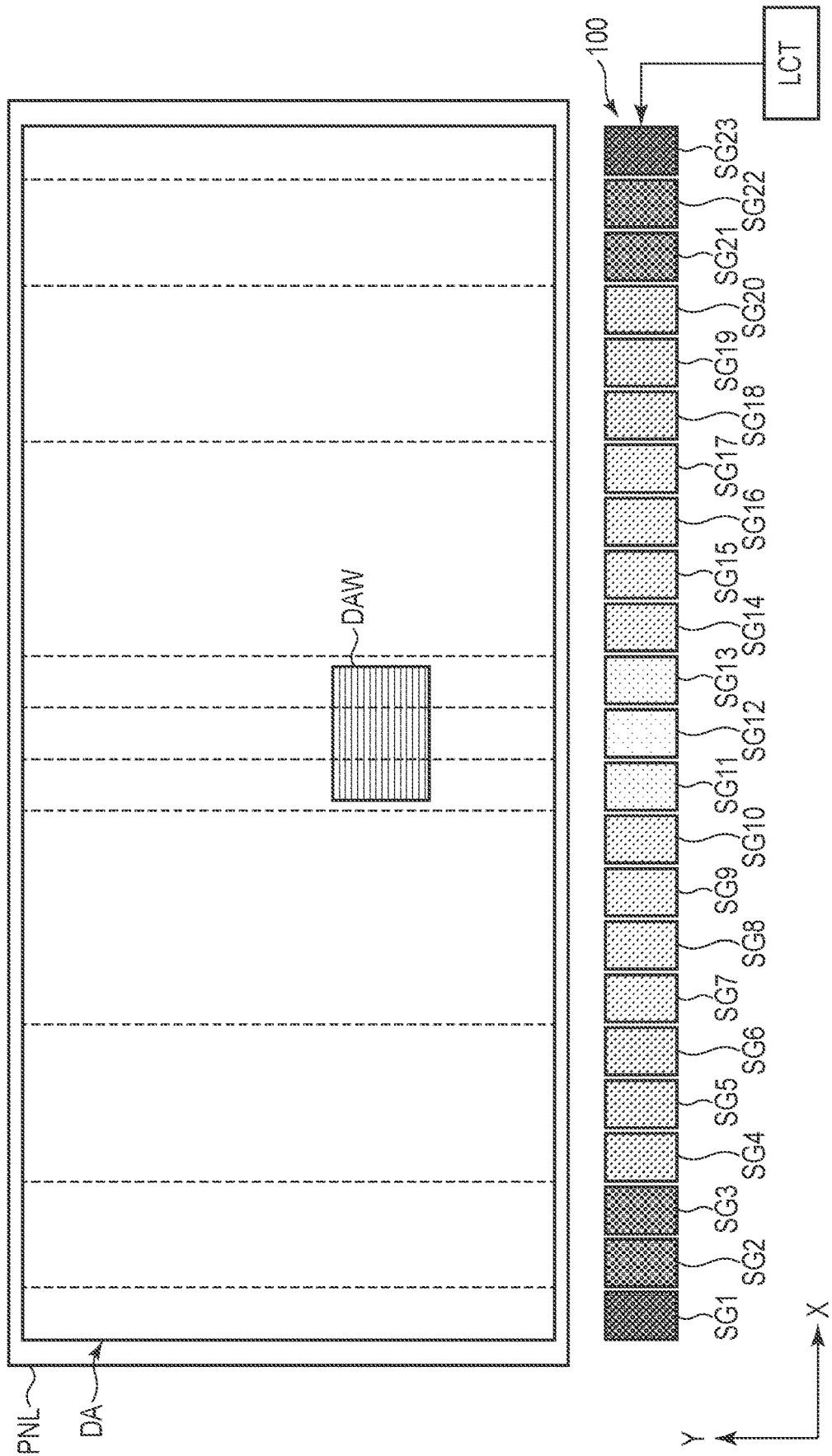
FIG. 9 is a diagram for explaining another local dimming drive of the first light emitting module 100.

FIG. 9 is a diagram for explaining another local dimming drive of the first light emitting module 100. The first light emitting module 100 includes segments SG1 to SG23. As described above, each segment includes a plurality of light sources and one light guide, but detailed illustration is omitted. Note that the first light emitting module 100 may include a plurality of light sources provided for each segment and a light guide continuous over a plurality of segments.

In the local dimming drive described below, a light source control unit LCT controls the current value of each light source according to the illumination area DAW of the display portion DA.

In the example illustrated in FIG. 9, the illumination area DAW corresponds to an area mainly illuminated by the segments SG11 to SG13. For example, the light source of the segment SG12 is driven with a current value at which the luminance becomes a first luminance, and each of the light sources of the segments SG11 and SG13 is driven with a current value at which the luminance becomes a second luminance smaller than the first luminance. Each of the light sources of the other segments SG1 to SG10 and SG14 to SG23 is driven with a current value at which the luminance becomes smaller than the second luminance.

In this way, by controlling the current value of each light source, it is possible to make the illumination area DAW bright and the periphery of the illumination area DAW dark, and to suppress the decrease in the contrast ratio.

Figure 10:
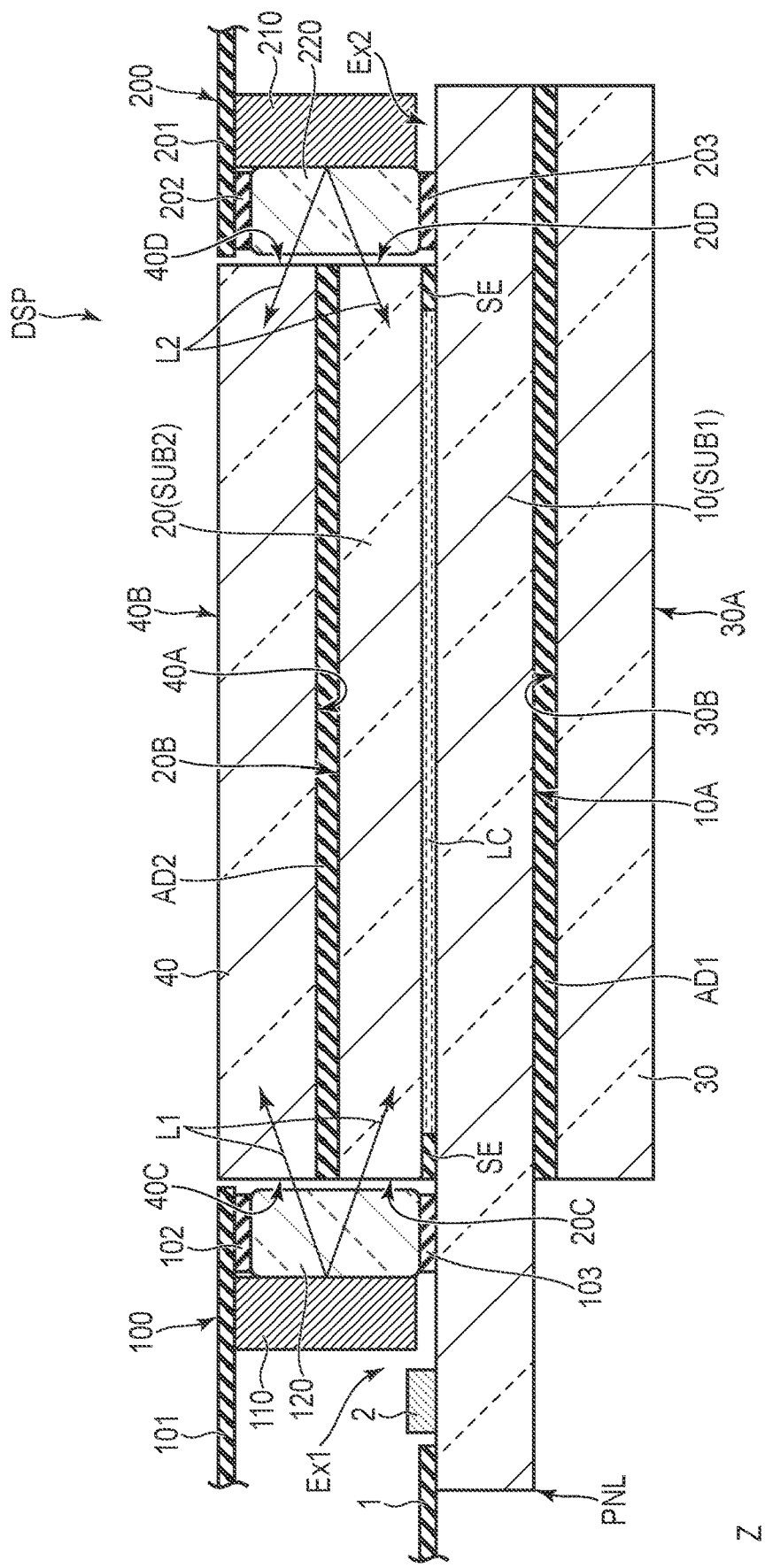
FIG. 10 is a cross-sectional view illustrating a configuration example of the display device DSP including the first light emitting module 100 and a second light emitting module 200.

FIG. 10 is a cross-sectional view illustrating a configuration example of a display device DSP including the first light emitting module 100 and the second light emitting module 200. Note that only the main part of the display panel PNL is illustrated in a simplified manner.

The display device DSP further includes a first cover member 30, a second cover member 40, a first adhesive layer AD1 that adheres the first substrate SUB1 and the first cover member 30, and a second adhesive layer AD2 that adheres the second substrate SUB2 and the second cover member 40. In the example illustrated in FIG. 10, the first cover member 30 overlaps the second extending portion Ex2 but does not overlap the first extending portion Ex1. The second cover member 40 does not overlap any of the first extending portion Ex1 and the second extending portion Ex2.

The first cover member 30 includes a main surface (outer surface) 30A and a main surface (inner surface) 30B opposite to the main surface 30A. The main surface 30B faces the main surface 10A of the transparent substrate 10. The first adhesive layer AD1 adheres the transparent substrate 10 and the first cover member 30. The second cover member 40 includes a main surface (inner surface) 40A and a main surface (outer surface) 40B opposite to the main surface 40A. The main surface 40A faces the main surface 20B of the transparent substrate 20. The second adhesive layer AD2 adheres the transparent substrate 20 and the second cover member 40. The transparent substrate 10, the transparent substrate 20, the first cover member 30, and the second cover member 40 have substantially the same thickness along the third direction Z.

The first cover member 30 and the second cover member 40 are, for example, glass substrates, but may be insulating substrates such as plastic substrates. The first cover member 30 has a refractive index equivalent to that of the transparent substrate 10. The first adhesive layer AD1 has a refractive index equivalent to that of each of the transparent substrate 10 and the first cover member 30. The second cover member 40 has a refractive index equivalent to that of the transparent substrate 20. The second adhesive layer AD2 has a refractive index equivalent to that of each of the transparent substrate 20 and the second cover member 40. Note that "equivalent" here is not limited to a case where the refractive index difference is 0, and includes a case where the refractive index difference is 0.03 or less.

In the second substrate SUB2, the transparent substrate 20 has side surfaces 20C and 20D. The side surface 20C substantially corresponds to the first side surface E21 illustrated in FIG. 1. The side surface 20D substantially corresponds to the second side surface E22 illustrated in FIG. 1. The second cover member 40 has a third side surface 40C and a fourth side surface 40D. The third side surface 40C is located directly above the first side surface 20C, and the fourth side surface 40D is located directly above the second side surface 20D.

The first light emitting module 100 overlaps the first extending portion Ex1. In the first light emitting module 100, the light source 110 is provided between the transparent substrate 10 and the wiring substrate 101 in the third direction Z. The light guide 120 is provided between the light source 110 and the first side surface 20C and between the light source 110 and the third side surface 40C in the second direction Y. The light guide 120 is adhered to the wiring substrate 101 by the adhesive layer 102, and is adhered to the first substrate SUB1 by the adhesive layer 103.

The second light emitting module 200 overlaps the second extending portion Ex2. In the second light emitting module 200, the light source 210 is provided between the transparent substrate 10 and the wiring substrate 201 in the third direction Z. The light guide 220 is provided between the light source 210 and the second side surface 20D and between the light source 210 and the fourth side surface 40D in the second direction Y. The light guide 220 is adhered to the wiring substrate 201 by the adhesive layer 202, and is adhered to the first substrate SUB1 by the adhesive layer 203.

Next, light L1 emitted from the light source 110 and light L2 emitted from the light source 210 will be described.

The first light emitting module 100 emits light toward the first side surface 20C and the third side surface 40C. The light L1 emitted from the light source 110 propagates along the direction of the arrow indicating the second direction Y, passes through the light guide 120, enters the transparent substrate 20 from the first side surface 20C, and enters the second cover member 40 from the third side surface 40C.

Similarly, the second light emitting module 200 emits light toward the second side surface 20D and the fourth side surface 40D. The light L2 emitted from the light source 210 propagates along the direction opposite to the arrow indicating the second direction Y, passes through the light guide 220, enters the transparent substrate 20 from the second side surface 20D, and enters the second cover member 40 from the fourth side surface 40D.

The light L1 and the light L2 incident on the transparent substrate 20 and the second cover member 40 propagate inside the display panel PNL while being repeatedly reflected. The light L1 and the light L2 incident on the liquid crystal layer LC to which no voltage is applied are transmitted through the liquid crystal layer LC without being almost scattered. In addition, the light L1 and the light L2 incident on the liquid crystal layer LC to which the voltage is applied are scattered by the liquid crystal layer LC. The display device DSP can be observed from the main surface 30A side and can also be observed from the main surface 40B side. In addition, even when the display device DSP is observed from the main surface 30A side or the main surface 40B side, the background of the display device DSP can be observed via the display device DSP.

Figure 11:
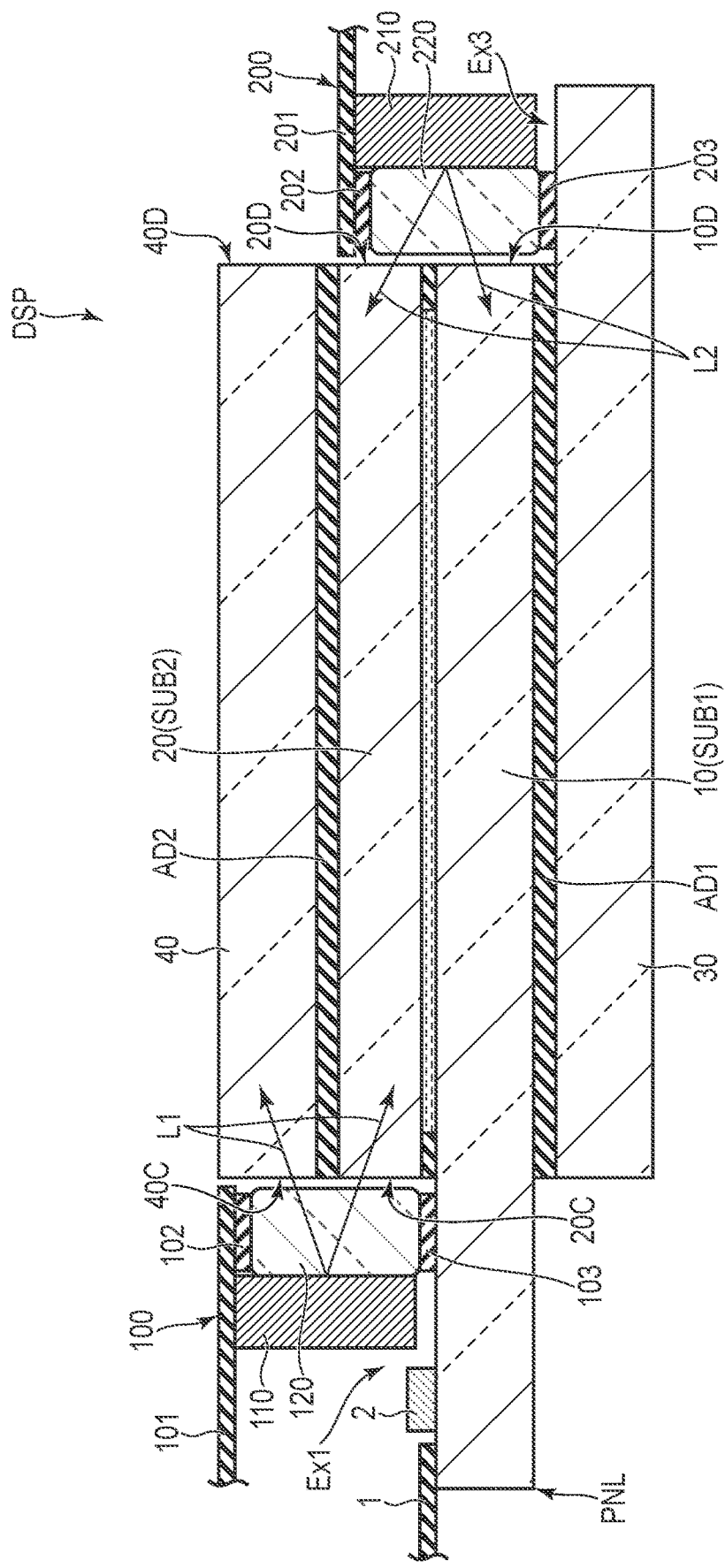
FIG. 11 is a cross-sectional view illustrating another configuration example of the display device DSP including the first light emitting module 100 and the second light emitting module 200.

FIG. 11 is a cross-sectional view illustrating another configuration example of the display device DSP including the first light emitting module 100 and the second light emitting module 200. Note that only the main part of the display panel PNL is illustrated in a simplified manner.

The configuration example illustrated in FIG. 11 is different from the configuration example illustrated in FIG. 10 in that the first cover member 30 includes the third extending portion Ex3 instead of the second extending portion Ex2 of the first substrate SUB1. The second cover member 40 does not overlap any of the first extending portion Ex1 and the third extending portion Ex3.

In the first substrate SUB1, the transparent substrate 10 has the fifth side surface 10D. The second side surface 20D is located directly above the fifth side surface 10D, and the fourth side surface 40D is located directly above the second side surface 20D.

The second light emitting module 200 overlaps the third extending portion Ex3. In the second light emitting module 200, the light source 210 is provided between the first cover member 30 and the wiring substrate 201 in the third direction Z. The light guide 220 is provided between the light source 210 and the second side surface 20D and between the light source 210 and the fifth side surface 10D in the second direction Y. The light guide 220 is adhered to the wiring substrate 201 by the adhesive layer 202, and is adhered to the first cover member 30 by the adhesive layer 203.

Such a second light emitting module 200 emits light toward the second side surface 20D and the fifth side surface 10D. The light L2 emitted from the light source 210 propagates along the direction opposite to the arrow indicating the second direction Y, passes through the light guide 220, enters the transparent substrate 20 from the second side surface 20D, and enters the transparent substrate 10 from the fifth side surface 10D. The light L1 incident on the transparent substrate 20 and the second cover member 40 and the light L2 incident on the transparent substrates 10 and 20 propagate inside the display panel PNL while being repeatedly reflected.

Even in such a configuration example, observation can be performed similarly to the configuration example illustrated in FIG. 10.

As described above, according to the present embodiment, it is possible to provide a display device capable of suppressing deterioration in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel having a main surface and a first side surface orthogonal to the main surface, and comprising a polymer dispersed liquid crystal layer including a polymer extending along a first direction; and
a first light emitting module provided along the first side surface, wherein
the first light emitting module includes:
a plurality of first light sources arranged in the first direction;
a plurality of second light sources arranged in the first direction;
a first light guide; and
a second light guide;
the plurality of first light sources and the first light guide face the first side surface of the display panel and are arranged in this order in a second direction, such that the first light guide is positioned between the plurality of first light sources and the display panel,
the plurality of second light sources and the second light guide that face the first side surface of the display panel are arranged in this order in the second direction, such that the second light guide is positioned between the plurality of second light sources and the display panel,
the first direction and the second direction cross each other and are parallel to the main surface,
the first light guide includes a first end surface extending along the second direction,
the second light guide includes a second end surface extending along the second direction,
the first light guide and the second light guide are arranged in the first direction, and
the first end surface of the first light guide and the second end surface of the second light guide face each other with an air layer interposed therebetween in the first direction.

2. The display device according to claim 1, wherein a length of the first light guide along the first direction is equal to a length of the second light guide along the first direction.

3. The display device according to claim 2, wherein the number of the first light sources facing the first light guide is the same as the number of the second light sources facing the second light guide.

4. The display device according to claim 3, wherein the number of the first light sources and the number of the second light sources are 2 to 4.

5. The display device according to claim 1, wherein each of the first light sources and each of the second light sources has a red light emitting point, a green light emitting point, and a blue light emitting point.

6. The display device according to claim 1, wherein the first light emitting module further includes: a wiring substrate electrically connected to the first light sources and the second light sources; and an adhesive layer that adheres the wiring substrate and the first light guide and adheres the wiring substrate and the second light guide.

7. The display device according to claim 1, wherein
the display panel further includes a first substrate including a pixel electrode and a second substrate including a common electrode, and the polymer dispersed liquid crystal layer is held between the first substrate and the second substrate, and
the display device further comprises:
a first cover member;
a first adhesive layer that adheres the first substrate and the first cover member;
a second cover member; and
a second adhesive layer that adheres the second substrate and the second cover member.

8. The display device according to claim 7, further comprising a second light emitting module provided along a second side surface of the display panel on an opposite side of the first light emitting module, wherein
the second substrate has the first side surface and the second side surface,
the first light emitting module overlaps a first extending portion of the first substrate, and
the second light emitting module overlaps a second extending portion of the first substrate.

9. The display device according to claim 8, wherein
the second cover member has a third side surface located directly above the first side surface and a fourth side surface located directly above the second side surface,
the first light emitting module emits light toward the first side surface and the third side surface, and
the second light emitting module emits light toward the second side surface and the fourth side surface.

10. The display device according to claim 7, further comprising a second light emitting module provided along a second side surface of the display panel on an opposite side of the first light emitting module, wherein
the second substrate has the first side surface and the second side surface,
the first light emitting module overlaps a first extending portion of the first substrate, and
the second light emitting module overlaps a third extending portion of the first cover member.

11. The display device according to claim 10, wherein
the second cover member has a third side surface located directly above the first side surface,
the first substrate has a fifth side surface located directly above the second side surface,
the first light emitting module emits light toward the first side surface and the third side surface, and
the second light emitting module emits light toward the second side surface and the fifth side surface.

12. The display device according to claim 8, further comprising a wiring substrate mounted on the first extending portion.

13. The display device according to claim 1, wherein an interval between the first end surface of the first light guide and the second end surface of the second light guide is smaller than either an interval between the first light sources adjacent in the first direction or an interval between the second light sources adjacent in the first direction.

14. The display device according to claim 1, wherein an interval between the first end surface of the first light guide and the second end surface of the second light guide is 1 mm or less.

15. The display device according to claim 1, wherein the first side surface extends along a long side of the display panel.

16. A display device comprising:
a display panel having a main surface and a first side surface orthogonal to the main surface, and comprising a polymer dispersed liquid crystal layer including a polymer extending along a first direction; and
a first light emitting module provided along the first side surface, wherein
the first light emitting module includes:
a plurality of first light sources arranged in the first direction;
a plurality of second light sources arranged in the first direction;
a first light guide; and
a second light guide,
the plurality of the first light sources and the first light guide that face the first side surface of the display panel are arranged in this order in a second direction, such that the first light guide is positioned between the plurality of first light sources and the display panel,
the plurality of the second light sources and the second light guide that face the first side surface of the display panel are arranged in this order in the second direction, such that the second light guide is positioned between the plurality of second light sources and the display panel,
the first direction and the second direction cross each other and are parallel to the main surface,
the first light guide includes a first end surface extending along the second direction,
the second light guide includes a second end surface extending along the second direction,
the first light guide and the second light guide are arranged in the first direction,
the first end surface of the first light guide and the second end surface of the second light guide face each other with an air layer interposed therebetween in the first direction, and
the first light sources and the second light sources are arranged in the first direction.

17. A display device comprising:
a display panel having a main surface and a first side surface orthogonal to the main surface, and comprising a polymer dispersed liquid crystal layer including a polymer extending along a first direction; and
a first light emitting module provided along the first side surface, wherein
the first light emitting module includes:
a plurality of first light sources arranged in the first direction;
a plurality of second light sources arranged in the first direction;
a first light guide; and
a second light guide,
the plurality of the first light sources and the first light guide that face the first side surface of the display panel are arranged in this order in a second direction, such that the first light guide is positioned between the plurality of first light sources and the display panel,
the plurality of the second light sources and the second light guide that face the first side surface of the display panel are arranged in this order in the second direction, such that the second light guide is positioned between the plurality of second light sources and the display panel,
the first direction and the second direction cross each other and are parallel to the main surface,
the first light guide includes a first end surface extending along the second direction,
the second light guide includes a second end surface extending along the second direction,
the first light guide and the second light guide are arranged in the first direction,
the first end surface of the first light guide and the second end surface of the second light guide face each other with an air layer interposed therebetween in the first direction,
the first light sources and the second light sources are arranged in the first direction, and
the second light sources are configured to emit light in the same direction as the first light sources.

18. The display device according to claim 1, wherein
the first light emitting module further includes a wiring substrate electrically connected to the first light sources and the second light sources,
the display panel further includes a first substrate including a pixel electrode and a second substrate including a common electrode,
the polymer dispersed liquid crystal layer is held between the first substrate and the second substrate,
the second substrate includes the first side surface facing the first light guide and the second light guide, and
the first light sources, the second light sources, the first light guide, and the second light guide are located between the wiring substrate and a first extending portion of the first substrate.

19. The display device according to claim 18, wherein the first light sources, the second light sources, the first light guide, and the second light guide are adhered to the wiring substrate and the first extending portion.

20. The display device according to claim 1, wherein
the display panel further includes a first substrate including a pixel electrode, a second substrate including a common electrode, and an IC chip mounted on a first extending portion of the first substrate, and
in a plan view, the first light sources, the second light sources, the first light guide, and the second light guide are located between the IC chip and the second substrate in the second direction.

* * * * *